US005777055A

United States Patent [19]

Peiffer et al.

[11] Patent Number: 5,777,055

[45] Date of Patent: Jul. 7, 1998

[54] RESIN-CONTAINING, BIAXIALLY ORIENTED POLYPROPYLENE FILM, PROCESS FOR THE PRODUCTION THEREOF, AND THE USE THEREOF

[75] Inventors: Herbert Peiffer, Mainz; Ursula Murschall, Nierstein; Thomas Dries, Schwabenheim, all of Germany

[73] Assignee: Hoechst Aktiengesellschaft, Germany

[21] Appl. No.: 500,136

[22] Filed: Jul. 10, 1995

Related U.S. Application Data

[63] Continuation of Ser. No. 326,082, Oct. 19, 1994, abandoned.

[30] Foreign Application Priority Data

Oct. 21, 1993 [DE] Germany .............. 43 35 960.4

[51] Int. Cl.$^6$ .................................................. C08F 10/06
[52] U.S. Cl. .................... 526/348.1; 526/351; 525/240
[58] Field of Search ..................... 526/348.1, 351; 525/240

[56] References Cited

U.S. PATENT DOCUMENTS

| | | | |
|---|---|---|---|
| 3,666,836 | 5/1972 | John | 260/897 |
| 4,289,831 | 9/1981 | Last | 428/515 |
| 4,419,410 | 12/1983 | Weiner | 428/516 |
| 4,786,533 | 11/1988 | Crass et al. | 428/13 |
| 4,921,749 | 5/1990 | Bossaert et al. | 428/216 |
| 5,128,183 | 7/1992 | Buzio | 428/35.7 |
| 5,213,744 | 5/1993 | Bossaert | 264/171 |
| 5,236,622 | 8/1993 | Yoneda et al. | 252/309 |

FOREIGN PATENT DOCUMENTS

| | | |
|---|---|---|
| 0 079 520 | 5/1983 | European Pat. Off. . |
| 0 217 388 | 4/1987 | European Pat. Off. . |
| 0 236 945 | 9/1987 | European Pat. Off. . |
| 0 317 276 | 5/1989 | European Pat. Off. . |
| 0 441 027 | 8/1991 | European Pat. Off. . |
| 0 544 652 | 6/1993 | European Pat. Off. . |
| 2 045 115 | 4/1971 | Germany . |
| 20 45 115 | 4/1971 | Germany . |
| 38 01 535 | 7/1988 | Germany . |
| 1 231 861 | 5/1971 | United Kingdom . |
| 2 028 168 | 3/1980 | United Kingdom . |
| 2 055 688 | 3/1981 | United Kingdom . |
| 2 201 407 | 9/1988 | United Kingdom . |

OTHER PUBLICATIONS

"Verpacken mit Kunststoffen" Günther Kühne, 1974, p. 63.
Ullmanns Encyklopädie der technischen Chemie, Dec. 28, 1976 pp. 525–555.

*Primary Examiner*—Thomas R. Weber
*Attorney, Agent, or Firm*—Connolly & Hutz

[57] ABSTRACT

The invention relates to a polypropylene film comprising a layer which comprises polypropylene and resin. The resin has a mean molecular weight $M_w$ of $\geq 1500$. The invention also relates to a process for the production of the film, and to the use of the film.

11 Claims, 4 Drawing Sheets

FIG. 1
Regalrez 1139

FIG. 2
Escorez 356

FIG. 3
Arkon P 125

RESIN-CONTAINING, BIAXIALLY ORIENTED POLYPROPYLENE FILM, PROCESS FOR THE PRODUCTION THEREOF, AND THE USE THEREOF

This application is a continuation of application Ser. No. 08/326,082 filed Oct. 19, 1994 and now abandoned.

FIELD OF THE INVENTION

The invention relates to polypropylene film comprising a layer which comprises polypropylene and resin. An aspect of this invention relates to a propylene polymer film suitable for use in making twist-wrapped packages (e.g. packages containing generally rounded objects which are closed or sealed by twisting an end of the packages) which has very good migration properties. The invention furthermore relates to a process for the production of the film and to the use of the film.

DESCRIPTION OF THE PRIOR ART

A particular type of closure of full wrappings for the purpose of packaging is twist wrapping. This packaging method is particularly known in the full wrapping of relatively small objects, this type of packaging frequently being particularly preferred for round or virtually round articles such as candy, bottles, candles, roll-packed confectionery, bars of chocolate and marzipan, Easter eggs or the like.

The prerequisite for use of the film in this area of application is its twist capacity. The resilience of the film must not result in it twisting back again after the pleat has been twisted, which means that the packed goods can easily fall out. According to the prior art, twist wrappings are made predominantly from cellophane, i.e. regenerated cellulose, un-oriented polypropylene or PVC film, cf. "Verpacken mit Kunststoffen" [Packaging using Plastics] by Günther Kühne, published 1974, Carl-Hanser-Verlag, Munich, page 63.

Very recently, polypropylene films which have been biaxially oriented to different extents have been proposed for use in twist wrapping, where these films contain a low-molecular-weight resin in order to achieve the desired twist properties. These known twist wrapping films have unsatisfactory migration behavior.

It is known from the prior art that certain additives which are added to the base layer of polypropylene films migrate to the surface after a certain time. This migration is desired since the additives can thus develop an advantageous effect on the surface. Such films are described, for example, in U.S. Pat. No. 4,419,410.

DE-C-20 45 115 describes the use of hydrogenated polymer mixtures in unsupported films, where the hydrogenated, vinyl aromatic hydrocarbon resins have a molecular weight distribution such that not more than about 15% of the polymer has a molecular weight outside the range from 600 to 20,000. It is stated that the compatibility of the resin having an Mw of greater than 20,000 drops considerably and material having an Mw of less than 600 makes the film tacky. Within the range from 600 to 20,000, the mean molecular weight is not crucial. The addition of resin imparts heat-sealing properties on the poly-olefin, which can itself only be heat-sealed with difficulty, or not at all.

GB-A-1,231,861 describes a boPP film which has good twist properties achieved by mixing the propylene homopolymer with a low-molecular-weight resin and by preferential orientation in the machine direction. Low-molecular-weight resins described are terpene polymers, compatible hydrogenated hydrocarbon resins or compatible rosins. The resins are characterized by their molecular weight, by their softening point and by their iodine number. Accordingly, preferred resins are those which have a molecular weight of greater than 600, a softening point of greater than 100° C. and an iodine number of less than 15. An example mentioned of a typical resin is picopale 100 having a molecular weight of about 1170, a softening point of about 100° C. and an iodine number of 200.

The resins described are highly compatible with the propylene homopolymer and can contribute to good mechanical properties and very good twist properties.

The resin, which has very low molecular weight compared with the propylene homopolymer, has considerable disadvantages with respect to preparation, processing and use in polypropylene films. The resin tends to separate out and diffuses to the surface of the film. During the production process, this can result in an increased tendency to stick or deposition of the resin, for example on rolls. During processing, the packed candy tend to block, preventing or restricting their further transport.

When the film is in contact with packed contents, in particular with fat-containing contents, a further serious disadvantage of the low-molecular-weight resins occurs. The resin migrates into the food after only a short time, which is impermissible according to food regulations. Films which contain migrating low-molecular-weight resins of this type therefore cannot be used for packaging fat-containing foods.

EP-A-0 217 388 describes a film which is likewise distinguished by good twist properties. In order to achieve the good twist behavior, a low-molecular-weight resin is added to the propylene homopolymer in the base layer. In addition, the process conditions are selected so that the modulus of elasticity in both orientation directions is greater than 3000 N/mm². In the example, the resin mentioned is Arkon P 125, which has a molecular weight of about 1000 and a softening point of 125° C. In addition to the above-mentioned advantages, this resin has significant disadvantages in the production of films, in the processing of films and on contact of the film with fat-containing foods.

Although the films described are covered with non-resin-containing outer layers, such strong diffusion of the resin to the surface of the film occurs even on contact with hot rolls (for example during longitudinal stretching) that deposition of the resin on the roll surfaces can occur relatively quickly. The machine must be cleaned frequently, which can result in significant loss in capacity.

Furthermore, these resins also have a very pronounced migration behavior. On contact of the film with fat, virtually all the resin present in the film has migrated into the fat, for example, after a test time of 10 days at a test temperature of 40° C.

GB-A-2,055,688 describes a multilayer, heat-sealable, transparent boPP film, having good mechanical properties and good heat-sealing properties. In order to improve the mechanical properties, the base layer contains a low-molecular-weight resin in addition to propylene homopolymer. The resin content is from 2 to 20% by weight. The outer layers essentially comprise a mixture of at least two copolymers which give the film excellent heat-sealability. The film is biaxially stretched, using both stepwise stretching and simultaneous stretching. The latter type of stretching is expensive, but can result in good twist properties of the film. In the examples, the resin mentioned is Arkon P 125, which has a molecular weight of about 1000 and therefore has the above-described extreme disadvantages with respect to diffusion and migration behavior.

GB-A-2,028,168 describes a heat-sealable boPP film having very good mechanical properties. In order to improve the mechanical properties, the base layer contains a lowmolecular-weight hydrocarbon resin in addition to the propylene homopolymer. The resin content is from 1 to 50% by weight. The resin used has a molecular weight of greater than 600, preferably 1000, and a softening point of greater than 70° C. Owing to the relatively low molecular weight of the resin used, the above-described disadvantages are expected.

U.S. Pat. No. 4,921,749 describes a heat-sealable boPP film having improved mechanical and optical properties. The heat-sealability of the film and the water vapor and oxygen permeability have likewise been improved. All the improvements result from the addition of a low-molecular-weight resin to the base layer. The resin content is between 3 and 30% by weight. The resin has a molecular weight of significantly less than 5000, preferably less than 1000, and is, for example, 600. The softening point of the resin is from 120° to 140° C. Owing to the stated stretching ratios of 5:1 in the machine direction and 10:1 in the transverse direction, the film has only limited suitability for twist wrapping. The low molecular weight of the resin means that diffusion of the resin through the film and migration into the food are very high.

EP-A-0 317 276 discloses a boPP film for twist application which contains a propylene homopolymer and a hydrocarbon resin in the base layer. The concentration of the resin is between 1 and 40% by weight. Owing to the formulation chosen, the film is said to be distinguished by good deadfold properties and to be suitable for use as a twist film. The resin used is, for example, a $C_9$-terpolymer (®Arkon P 125), which has a molecular weight of about 1000. The disadvantages of a resin of this type were described above.

There is accordingly still a need in this art for a film with good twist behavior for twist wrapping which does not result in an increase in the concentration of resin in packaged fat-containing foods and which still provides the other film properties required for use as a twist wrapping, e.g. properties such as good transparency, high sheen and good scratch resistance.

SUMMARY OF THE INVENTION

A film according to this invention comprises a layer which comprises polypropylene and resin, preferably a hydrocarbon resin, wherein the resin has a mean molecular weight $M_w$ of $\geq 1500$. Preferably, the film has single layer. It is also preferred that the film have a permanent set value in the longitudinal and transverse directions of greater than 50% and that any portion of the resin which has a molecular weight <1000 be at most 35% by weight of the resin component of the film.

A film of this invention is made by extruding a propylene polmer melt through a flat-film die, taking off the resulting extruding film over a take-off roll whose temperature is between 10 and 100 C, biaxially stretching at a longitudinal stretching ratio of from 5:1 to 9:1 and a transverse stretching ratio of from 5:1 to 9:1, heat-setting the biaxially-stretched film, optionally subjecting the film to a corona treatment, and then winding it up. The resulting film is suitable for twist wrapping and meets the needs of this art as outlined above.

DETAILED DESCRIPTION

Study of packaged fat-containing foods has shown that resins having a mean molecular weight $M_w$ of less than 1500 migrate into the fat-containing food, where they increase in concentration. This effect is extremely undesired and highly restricts the use of many resin-containing films for food packaging. Surprisingly, migration of the resin is prevented if a resin having a mean molecular weight $M_w$ of $\geq 1500$ is employed in the film.

A single-layer film (or the base layer of a composite film) according to the invention essentially comprises a propylene polymer or a mixture of propylene polymer with other polyolefins in addition to the resin. In general, the film comprises from 60 to 95% by weight, preferably from 60 to 90% by weight, in particular from 65 to 85% by weight, of propylene polymer, based on the weight of the base or single layer.

The propylene polymer generally employed in the single-layer film comprises predominantly at least 90% by weight, preferably at least 95% by weight propylene units, based on the weight of the polymer (and can be a propylene homopolymer containing 100% by weight propylene) and has a melting point of 140° C. or above, preferably from 150° to 170° C. Isotactic homopolypropylene having an n-heptane-soluble content of 6% by weight or less, based on the isotactic homopolypropylene, is preferred. The homopolymer generally has a melt flow index of from 0.5 g/10 min to 15 g/10 min, preferably from 2.0 g/10 min to 10 g/10 min (measured at 230° C. and with a force of 21.6 N according to DIN 53 735).

The base layer can, due to the use of regenerated film additionally comprise copolymers of ethylene and propylene having an ethylene content of 10% by weight and less, copolymers of propylene with $C_4$–$C_8$-α-olefins having an α-olefin content of 10% by weight or less in small amounts, generally from 0 to 10% by weight, preferably from 1 to 5% by weight, based on the total weight of the base layer.

The terms "polypropylene" and "propylene polymer" or "polymer of propylene" are used generally synonymously in this application and refer both to homopolymers containing only propylene units and copolymers (including terpolymers, quaterpolymers, etc.) containing a minor amount of other repeating units.

The propylene polymer employed in the single-layer film can optionally be partially degraded by addition of organic peroxides. A measure of the degree of degradation of the polymer is the degradation factor A, which gives the relative change in the melt flow index, measured in accordance with DIN 53 735, of the polypropylene, based on the starting polymer.

$$A = \frac{MFI_2}{MFI_1}$$

$MFI_1$=melt flow index of the propylene polymer before addition of the organic peroxide
$MFI_2$=melt flow index of the peroxidically degraded propylene polymer.

In general, the degradation factor A of the propylene polymer employed is in the range from 2 to 15, preferably from 4 to 10.

Particularly preferred organic peroxides are dialkyl peroxides, where the term alkyl radical is taken to mean a conventional saturated, straight-chain or branched lower alkyl radical having up to six carbon atoms. Particular preference is given to 2,5-dimethyl-2,5-di (t-butylperoxy) hexane and di-t-butyl peroxide.

The single-layer film according to the invention contains a resin having a mean molecular weight $M_w$ of $\geq 1500$, preferably from 1800 to 8000, in particular from 2000 to 6500, generally in an amount of from 3 to 40% by weight, preferably from 5 to 35% by weight, in particular from 15 to 35% by weight, based on the weight of the single-layer film. The selection of a relatively high-molecular-weight resin having a mean molecular weight $M_w$ of at least 1500 is essential for the improved migration behavior. It has been found that constituents of the resin having a molecular weight $M_w$ of less than 1000 migrate particularly well. It is therefore essential to the invention that the resin has a mean molecular weight $M_w$ of at least 1500. It is particularly advantageous if the resin employed contains only small amounts having a molecular weight of less than 1000. These amounts should if possible be less than 35% by weight, preferably less than 30% by weight, in particular less than 25% by weight, in each case based on the weight of the resin.

Preferred resins are in particular hydrocarbon resins. The hydrocarbon resins may be partially or fully hydrogenated. Suitable resins are basically synthetic resins or resins of natural origin. It has proven particularly advantageous to employ resins having a softening point of $\geq 80°$ C. (measured in accordance with DIN 1995-U4 or ASTM E-28), those having a softening point of from 100° to 180° C., in particular from 120° to 160° C., being preferred. The resin is preferably incorporated into the film (for example single-screw or cascade extruder) in the form of a masterbatch, which is introduced into the extruder. Examples of conventional masterbatches are those containing from 30 to 70% by weight, preferably 50% by weight, of propylene homopolymer and from 70 to 30% by weight, preferably 50% by weight, of hydrocarbon resin. The data in percent by weight relate to the total weight of propylene polymer and hydrocarbon resin.

Of the numerous resins, hydrocarbon resins are preferred, particularly in the form of petroleum resins, styrene resins, cyclopentadiene resins and terpene resins (these resins are described in Ullmanns Encyklopädie der techn. Chemie [Ullmann's Encyclopedia of Industrial Chemistry], 4th Edition, Volume 12, pages 525 to 555).

The petroleum resins are those hydrocarbon resins prepared by polymerization of deep-decomposed petroleum materials in the presence of a catalyst. These petroleum materials usually contain a mixture of resin-forming substances, such as styrene, methylstyrene, vinyltoluene, indene, methylindene, butadiene, isoprene, piperylene and pentylene. The styrene resins are homopolymers of styrene or copolymers of styrene with other monomers such as methylstyrene, vinyltoluene and butadiene. The cyclopentadiene resins are cyclopentadiene homopolymers or cyclopentadiene copolymers obtained from coal tar distillates and fractionated petroleum gas. These resins are prepared by keeping the materials containing cyclopentadiene at high temperature for a long time. Depending on the reaction temperature, dimers, trimers or oligomers can be obtained.

The terpene resins are polymers of terpenes, i.e. hydrocarbons of the formula $C_{10}H_{16}$, which are present in virtually all essential oils or oil-containing resins from plants, and phenol-modified terpene resins. Specific examples of terpenes which may be mentioned are pinene, α-pinene, dipentene, limonene, myrcene, camphene and similar terpenes. The hydrocarbon resins can also be so-called modified hydrocarbon resins. The modification is generally carried out by reaction of the raw materials before the polymerization, by the introduction of specific monomers or by reaction of the polymerized product, in particular by hydrogenation or partial hydrogenation.

Hydrocarbon resins employed are also styrene homopolymers, styrene copolymers, cyclopentadiene homopolymers, cyclopentadiene copolymers and/or terpene polymers having a softening point of in each case above 100° C. (in the case of unsaturated polymers, the hydrogenated product is preferred). Very particular preference is given in the single-layer film to cyclopentadiene polymers having a softening point of 140° C. or above.

The thickness of the polypropylene film according to the invention can vary within broad limits and depends on the intended use. It is preferably from 5 to 100 µm, in particular from 10 to 60 µm.

The density of the film is generally 0.9 g/cm$^2$ or above, preferably in the range from 0.9 to 1.0 g/cm$^2$.

In order to improve the adhesion properties, at least one surface of the film can be corona- or flame-treated, where, if desired, the corresponding treatment can be carried out on both surfaces and can be identical or different.

In order further to improve specific properties of the polypropylene film according to the invention, it may contain further additives in an amount effective in each case, preferably antistatics and/or antiblocking agents and/or lubricants and/or stabilizers and/or neutralizers, which are compatible with the propylene polymers, with the exception of the antiblocking agents, which are generally incompatible. All amount data hereinafter in percent by weight (% by weight) in each case relate to the overall weight of the film.

Preferred antistatics are alkali metal alkanesulfonates, polyether-modified, i.e. ethoxylated and/or propoxylated polydiorganosiloxanes (polydialkylsiloxanes, polyalkylphenylsiloxanes and the like) and/or essentially straight-chain and saturated aliphatic, tertiary amines containing an aliphatic radical having 10 to 20 carbon atoms which are substituted by ω-hydroxy-($C_1$–$C_4$)alkyl groups, N,N-bis(2-hydroxyethyl) alkylamines having 10 to 20 carbon atoms, preferably 12 to 18 carbon atoms, in the alkyl radical being particularly suitable. The effective amount of antistatic is in the range from 0.05 to 0.5% by weight. Furthermore, glycerol monostearate is preferably employed as antistatic, in an amount of from 0.03% to 0.5%.

Suitable antiblocking agents are inorganic additives such as silicon dioxide, calcium carbonate, magnesium silicate, aluminum silicate, calcium phosphate and the like and/or incompatible organic polymers such as polyamides, polyesters, polycarbonates and the like. Preference is given to benzoguanamine-formaldehyde polymers, silicon dioxide and calcium carbonate. The effective amount of antiblocking agent is in the range from 0.01 to 1% by weight, preferably from 0.05 to 0.8% by weight. The mean particle size is between 1 and 6 µm, in particular 2 and 5 µm, particles having a spherical shape, as described in EP-A-0 236 945 and DE-A-38 01 535, being particularly suitable.

Lubricants are higher aliphatic acid amides, higher aliphatic acid esters, waxes and metal soaps and polydimethylsiloxanes. The effective amount of lubricant is in the range from 0.01 to 3% by weight, preferably from 0.02 to 1% by weight. Particularly suitable is the addition of higher aliphatic acid amides in the range from 0.01 to 0.25% by weight. A particularly suitable aliphatic acid amide is erucamide.

The addition of polydimethylsiloxanes is preferred in the range from 0.02 to 2.0% by weight, in particular polydimethylsiloxanes having a viscosity of from 10,000 to 1,000,000 m$^2$/s.

Stabilizers which can be employed are conventional compounds which have a stabilizing action for polymers of ethylene, propylene and other α-olefins. Their added amount is between 0.05 and 2% by weight. Particularly suitable are phenolic stabilizers, alkali metal or alkaline earth metal stearates and/or alkali metal or alkaline earth metal carbonates.

Phenolic stabilizers are preferred in an amount of from 0.1 to 0.6% by weight, in particular from 0.15 to 0.3% by weight, and having a molecular weight of greater than 500 g/mol. Pentaerythrityl tetrakis[3-(3,5-di-tert-butyl-4-hydroxypenyl) propionate] and 1,3,5-trimethyl-2,4,6-tris(3,5-di-tert-butyl-4-hydroxybenzyl) benzene are particularly advantageous.

Neutralizers are preferably calcium stearate and/or dihydrotalcite and/or calcium carbonate having a mean particle size of at most 0.7 μm, an absolute particle size of less than 10 μm and a specific surface area of at least 40 m²/g.

The invention furthermore relates to a process for the production of the polypropylene film according to the invention by the extrusion process, which is known per se. This process is carried out by extruding the polymer melt through a flat-film die, taking off the resultant film over one or more rolls for solidification, subsequently biaxially stretching (orienting) the film, heat-setting the biaxially stretched film and, if desired, corona-treating the surface layer intended for corona treatment.

The biaxial stretching (orientation) is generally carried out consecutively, consecutive biaxial stretching, in which stretching is carried out first longitudinally (in the machine direction) and then transversely (perpendicular to the machine direction), being preferred.

First, as is customary in extrusion, the mixture of polypropylene and resin is compressed and liquefied in an extruder, it being possible for any additives already added to be present in the mixture. The melt is then pressed through a flat-film die (slot die), and the extruded film is drawn off over one or more take-off rolls, where it cools and solidifies.

The resultant film is then stretched longitudinally and transversely to the extrusion direction, which results in alignment of the molecule chains. The longitudinal stretching is expediently carried out with the aid of two rolls running at different speeds corresponding to the desired stretching ratio, and the transverse stretching is expediently carried out with the aid of an appropriate tenter frame. For the twist wrapping film, the conditions in the longitudinal and transverse directions are selected so that the film has approximately balanced orientation in the longitudinal and transverse directions and has substantially isotropic mechanical properties. For example, the ratio between the permanent set or tear strength in the transverse direction and the permanent set or tear strength in the longitudinal direction is at most 2.0. The prerequisites for achieving very good twist properties are then particularly favorable. It has furthermore been found that the twist properties are better the more the film has been stretched in the longitudinal direction. The longitudinal stretching ratios according to the invention are from 5.0 to 9, preferably from 5.5 to 8.0. The transverse stretching ratios should also be selected accordingly. The preferred range here is from 5.0 to 9.0. Unlike other packaging films, the film is expediently not highly stretched in the transverse direction. The use of a longitudinal stretching ratio of $\lambda=4.5$ and a transverse stretching ratio of $\lambda=10$ gives—even in the case of addition of large amounts of resin—a film having comparatively poor twist properties. In order to achieve the twist properties essential to the invention, a ratio between the stretching ratios in the transverse and longitudinal directions of less than 2, preferably less than 1.5, should be observed. This ratio is particularly preferably in the range from 0.5 to 1.5.

The transverse stretching is generally carried out by first stretching the film to a maximum width $B_{max}$ on a transverse tenter frame. Before the subsequent heat setting, the tenter frame contracts slightly again, so that the final film width is smaller than the maximum width $B_{max}$ of the tenter frame.

The degree of contraction of the tenter frame as given as convergence, which is calculated from the maximum width of the teuter frame $B_{max}$ and the final film width $B_{film}$ according to the following formula:

$$\text{convergence} = \frac{B_{max} - B_{film}}{B_{max}}$$

The transverse stretching ratio is an effective value which is calculated from the final film width $B_{film}$, the width of the unstretched edge region of the film $B_{edge}$ and the width of the longitudinally stretched film $B_{long}$ according to the following formula:

$$\lambda = \frac{B_{film} - 2 \cdot B_{edge}}{B_{long} - 2 \cdot B_{edge}}$$

Biaxial stretching of the film is followed by heat-setting (heat treatment), the film being kept at a temperature of from 100° to 160° C. for about 0.1 to 10 seconds. The film is subsequently wound up in the conventional manner by means of a wind-up unit.

It has proven particularly favorable to keep the take-off roll or rolls, by means of which the extruded film is cooled and solidified, at a temperature of from 10° to 100° C., preferably from 20° to 70° C., by means of a heating and cooling circuit.

The temperatures at which longitudinal and transverse stretching are carried out can vary in a relatively broad range and depend on the respective composition of the polymer mixture and on the desired properties of the film. In general, the longitudinal stretching is preferably carried out at from 80° to 150° C. and the transverse stretching preferably at from 120° to 170° C.

If desired, one or both surfaces of the film can, as mentioned above, be corona- or flame-treated by one of the known methods after the biaxial stretching. The treatment intensity is generally in the range from 37 to 50 mN/m, preferably from 39 to 45 mN/m.

In the case of corona treatment an expedient procedure is to pass the film between two conductor elements serving as electrodes, such a high voltage, usually alternating voltage (from about 5 to 20 kV and from 5 to 30 kHz), being applied between the electrodes that spray or corona discharges can occur. The spray or corona discharge ionizes the air above the film surface and reacts with the molecules of the film surface, causing formation of polar inclusions in the essentially non-polar polymer matrix.

For flame treatment with a polarized flame (cf. U.S. Pat. No. 4,622,237), a direct electric voltage is applied between a burner (negative pole) and a chill roll. The level of the applied voltage is between 400 and 3000 V, preferably in the range from 500 to 2000 V. The applied voltage gives the ionized atoms increased acceleration, and they hit the polymer surface with greater kinetic energy. The chemical bonds within the polymer molecule are more easily broken, and formation of free radicals proceeds more rapidly. Heating of the polymer here is substantially less than in the case of standard flame treatment, and films can be obtained in which the heat-sealing properties of the treated side are even better than those of the untreated side.

It has been found that a resin having a mean molecular weight $M_w$ of at least 1500 has advantageous effects. The resin contributes in the desired manner toward improving the twist properties, but at the same time has very low migration values. Thus, a single-layer film which can be used for the twist wrapping of chocolate-containing candy has been provided for the first time. All previously known films could not be employed due to migration of the resin into the food. It has furthermore been found that, in addition to the mean molecular weight $M_w$ of the resin of at least 1500, its molecular weight distribution in the region of molecular weights below 1000 additionally plays a role in migration. While the prior art teaches the use of precisely these low-molecular-weight resins or regards the molecular weight or molecular weight distribution as unimportant, it has now been found that precisely these low-molecular-weight constituents migrate considerably. It is therefore particularly favorable if, in addition to a minimum value for the mean molecular weight $M_w$ (1500), it is additionally ensured that the constituents of the resin are as low as possible with a molecular weight in the region below 1000.

Surprisingly, the desired mechanical film properties are also achieved by means of these relatively high-molecular-weight resins.

The embodiments of the film with approximately balanced orientation are distinguished by excellent twist properties. The twistability of the film can be described very well by two physical parameters of the film. The twistability is better the higher the permanent set (in the longitudinal and transverse directions; measurement method see below) and the smaller the elongation at break in the longitudinal direction. The values of the above physical parameters should be approximately the same in both directions. The relationship between the values for permanent set $D_t:D_L$ is generally less than 2.0, preferably in the range from 0.5 to 1.5, in particular in the range from 0.7 to 1.3. The values for transverse and longitudinal elongation at break also form the corresponding ratios.

Good twistability is obtained if the permanent set values for both directions are greater than 50%, preferably in the range from 50 to 90%.

The elongation at break is determined in accordance with DIN 53 455. The single-layer films according to the invention have elongation at break values in both directions of less than 160%, preferably less than 130%.

In summary, it should be noted that the single-layer polypropylene film according to the invention is distinguished by a combination of properties which hitherto could not be achieved at the same time in a film:

very good twist properties, very good migration behavior, in particular low migration in fat-containing foods, no resin deposition on the rolls, no mutual blocking of the film packaging, very good scratch resistance.

This combination of properties provides according to the invention for the first time a film which really can be used commercially for the proposed use as a twist wrapping film, for example for chocolate-containing candy.

The raw materials and films were characterized using the following measurement methods:

Melt flow index

The melt flow index was measured in accordance with DIN 53 735 at a load of 21.6 N and 230° C. or at a load of 50 N and 190° C.

Melting point

DSC measurement, maximum of the melting curve, heating rate 20° C./min.

Viscosity index J

The viscosity index is a measure of the molecular weight. The viscosity index is measured in accordance with DIN 53 728, Part 4, in 0.1% strength decahydronaphthalene solution at 135° C.

Density ρ

The density is determined in accordance with DIN 53 479, Method A.

Decree of crystallization α

The degree of crystallization can be determined from the following equation:

$$\alpha = \frac{\rho - \rho_{amorph}}{\rho_{kristallin} - \rho_{amorph}} \cdot 100\%$$

where $\rho_{amorphous}$ = 0.8549 g/cm³

$\rho_{crystalline}$ = 1.0005 g/cm³

$\rho$ = density of the HDPE grade employed

Haze

The haze of the film was measured in accordance with ASTM-D 1003-52.

Sheen

The sheen was determined in accordance with DIN 67 530. The reflector value was measured as an optical parameter for the surface of a film. In accordance with the standards ASTM-D 523-78 and ISO 2813, the angle of incidence was set at 60° or 85°. A light beam hits the planar test surface at the set angle of incidence and is reflected or scattered thereby. The light beams incident on the photoelectronic receiver are indicated as a proportional electrical quantity. The measurement value is dimensionless and must be specified together with the angle of incidence.

Roughness

The roughness was determined in accordance with DIN 4768.

Friction

The friction was determined in accordance with DIN 53375.

Surface tension

The surface tension was determined by the ink method (DIN 53 364).

Printability

The corona-treated films were printed 14 days after production (short-term assessment) and 6 months after production (long-term assessment). The ink adhesion was assessed by an adhesive-tape test. If little ink was removable by means of an adhesive tape, the ink adhesion was assessed as being moderate, and if a significant amount of ink was removable, it was assessed as being poor.

Determination of the permanent set

Figure 4:
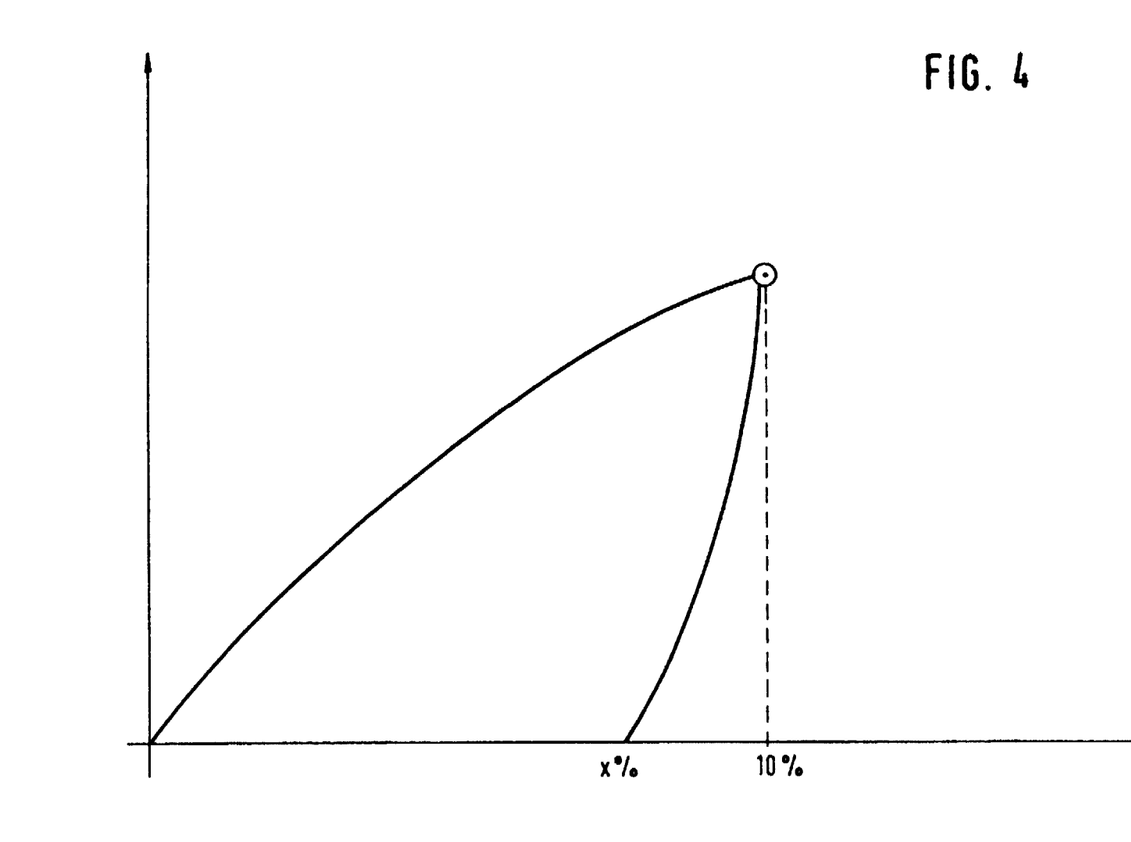
FIG. 4 is a stress/strain diagram for a film to be measured for permanent set in a tensile testing machine; the permanent set is calculated from an equation set forth below.

A 15 mm wide strip was cut out of the film perpendicular to the machine direction and clamped in a tensile testing machine, the distance between the clamps being 200 mm. The sample was then stretched at 20 mm/min, corresponding to 10%/min. After an elongation of 10%, i.e. at a sample length of 220 mm, the sample was automatically relaxed at the same rate. The determination of the permanent set from the stress/strain diagram is shown diagrammatically in the attached FIG. 4. The permanent set is calculated from $$D_b = \frac{X\%}{10\%} \cdot 100\%$$

Molecular weight determination

Figure 1:
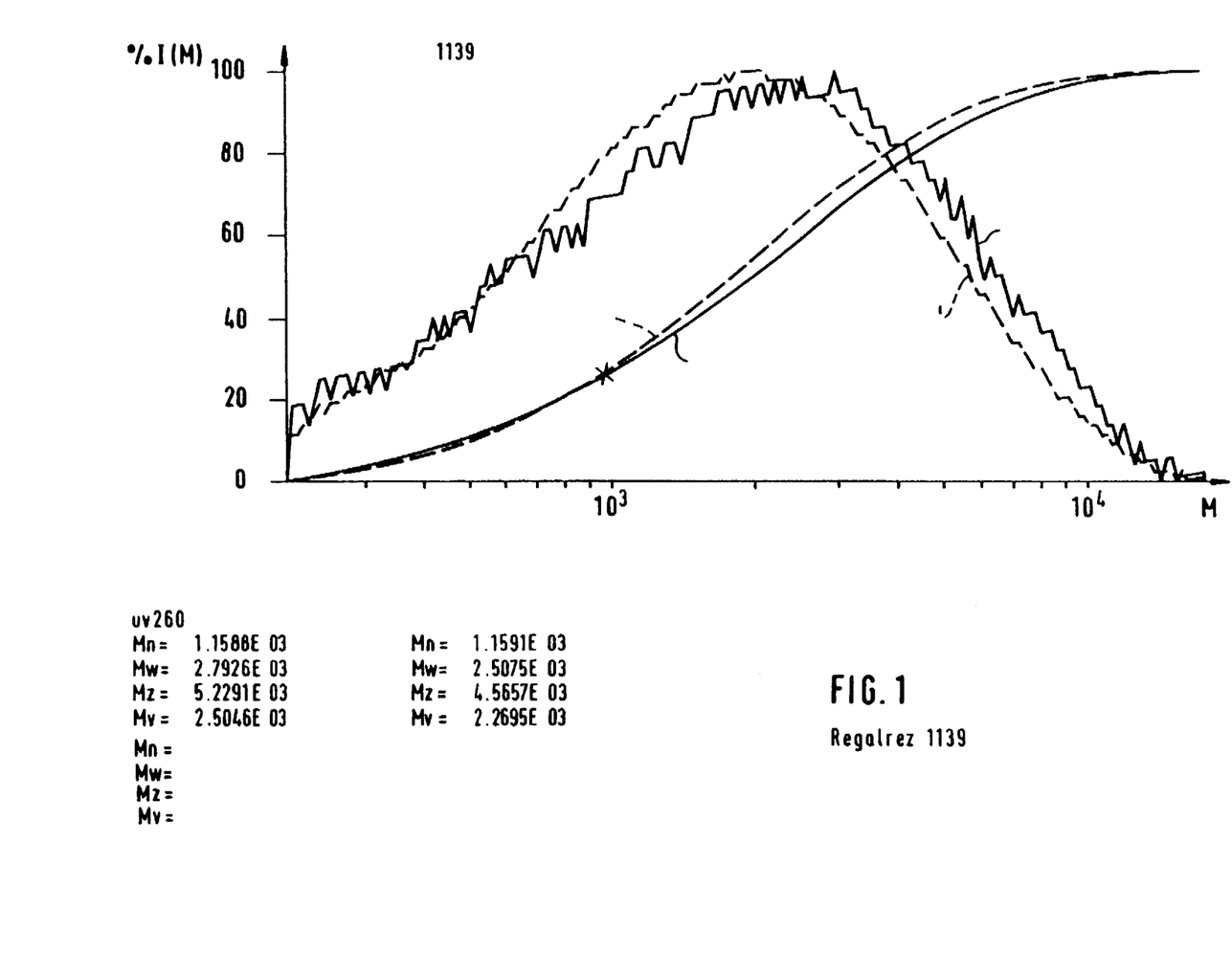
FIG. 1 is a plot of percentage portions of invidividual resin fractions which appear to be molecularly uniform against their molecular weight (curve A) and the percentage proportion of molecular weight fractions up to a certain molecular weight (curve B) for a resin ("Regalrez 1139") which is particularly useful as a resin component of a biaxially-oriented propylene polymer film of this invention.

In order to determine the molecular weight, three-detector gel permeation chromatography is used. The substance is dissolved in an eluent, such as THF, and passed through a separation column. The separation column is 90 cm in length and is filled with a porous support material whose pore size is 5 µm. Detection is carried out by UV absorption spectroscopy at various wavelengths and by means of refractive index and light scattering capacity of the fractions. The calibration is carried out by means of a standard compound of known molecular weight. Comparison of the UV absorption of the standard substance with the absorption of the sample enables the assignment of molecular weights. A plot of percentage proportions of the individual fractions thought to be molecularly uniform against their molecular weight (see, for example, FIGS. 1 to 3) is the distribution curve (curve A). In addition, the cumulative curve (curve B) shows the percentage proportion of the fractions up to a certain molecular weight. For example, point X on the cumulative curve in FIG. 1 shows that a resin proportion of 25% by weight has a molecular weight of below 1000. The mean molecular weight $M_w$, which is defined as the weight average of the molecular weight distribution, is determined as abscissa value from the maximum of the distribution curve.

Migration behavior

In order to test the migration behavior, circular film samples are brought into contact on one side, the side to be tested, with the $^{14}C$-labeled test fat HB 307. In this test, 120 ml of fat are applied to an area of 0.62 $dm^2$. The samples are stored for 10 days at 40° C. in migration cells. The migration values are determined by the K. Figge method given in Bundesgesundheitsblatt 18 (1975), 27.

Scratch resistance or scratch sensitivity

The scratch resistance is determined in accordance with DIN 53 754. The scratch resistance is determined using a Taber 503 Abraser abrasion tester from Teledyne Taber, using Calibrade R H18 friction wheels loaded with 250 g. The scratch resistance or scratch sensitivity is taken to mean the increase in haze of the scratched film compared with the original film after 50 revolutions of the sample plate. The scratch resistance is scored very good (++) if the increase in haze is less than 22%, good (+) if the increase in haze is from 22 to 25%, moderate (±) if the increase in haze is from 25 to 30%, and poor (−) if the increase in haze is greater than 30%.

The following non-limiting Examples illustrate the principles and practice of this invention.

EXAMPLE 1

A single-layer film having an overall thickness of 21 μm was produced by extrusion followed by stepwise orientation in the longitudinal and transverse directions.

Composition of the film:

| | |
|---|---|
| 71.65% by weight of | isotactic polypropylene |
| 28.00% by weight of | hydrocarbon resin [®Regalrez 1139 from Hercules Inc. (copolymer of α-methylstyrene and vinyltoluene)] having a softening point of 140° C. and a mean molecular weight $M_w$ of about 2500 |
| 00.20% by weight of | N,N-bisethoxyalkylamine |
| 00.10% by weight of | erucamide |
| 00.05% by weight of | silicon dioxide having a particle diameter of 2.5 μm. |

The melt flow index of the mixture was $I_{21.6}$=10 g/10 min or $I_{50.0}$ =50g/10 min.

The production conditions in the individual process steps were:

Extrusion: Temperature=190° C. Temperature of the take-off roll: 30° C.

Longitudinal stretching: Temperature T=110° C. Longitudinal stretching ratio=6.0

Transverse stretching: Temperature T=150° C.

Transverse stretching ratio=7.3 Convergence 25%

Setting: Temperature T=110° C.

The hydrocarbon resin employed had the molecular weight distribution shown in FIG. 1. The proportion of resin having a molecular weight of less than 1000 was about 28%.

The single-layer film produced in this way had the properties listed in the table (first line: Example 1). Before being rolled up, the film was subjected to corona treatment in order to ensure printability. The surface tension of the film as a consequence of this treatment was 42 mN/m.

EXAMPLE 2

As in Example 1, a single-layer film having an overall thickness of 21 μm was produced. In contrast to Example 1, the resin content was now 20% by weight. The resin remained the same. The extrusion temperatures were kept the same. Owing to the lower resin content, the conditions in the longitudinal and transverse stretching were modified as follows:

Longitudinal stretching: Temperature T=115° C. Longitudinal stretching ratio=7.2

Transverse stretching: Temperature T=152° C. Transverse stretching ratio=7.2 Convergence 20%

The film properties are listed in the table, second line (Example 2).

EXAMPLE 3

In contrast to the above Examples (1 and 2), the resin content was reduced to 15%. The conditions in the stretching units were as follows:

Longitudinal stretching: Temperature T=120° C. Longitudinal stretching ratio=7.7

Transverse stretching: Temperature T=153° C. Transverse stretching ratio=7.2

EXAMPLE 4

In contrast to Example 1, a hydrocarbon resin having a mean molecular weight $M_w$ of about 2100 [®Regalrez 1128 (copolymer of α-methylstyrene and vinyltoluene)] was now used. The other conditions were kept constant.

Comparative Example 1

In contrast to Example 1, a hydrocarbon resin having a mean molecular weight $M_w$ of about 860 [®Escorez ECR 356 (cyclopentadiene resin)] was now used. Deposition on the rolls was considerable, the packed candy tended to block, and, in particular, the migration behavior into fat was too great.

Figure 2:
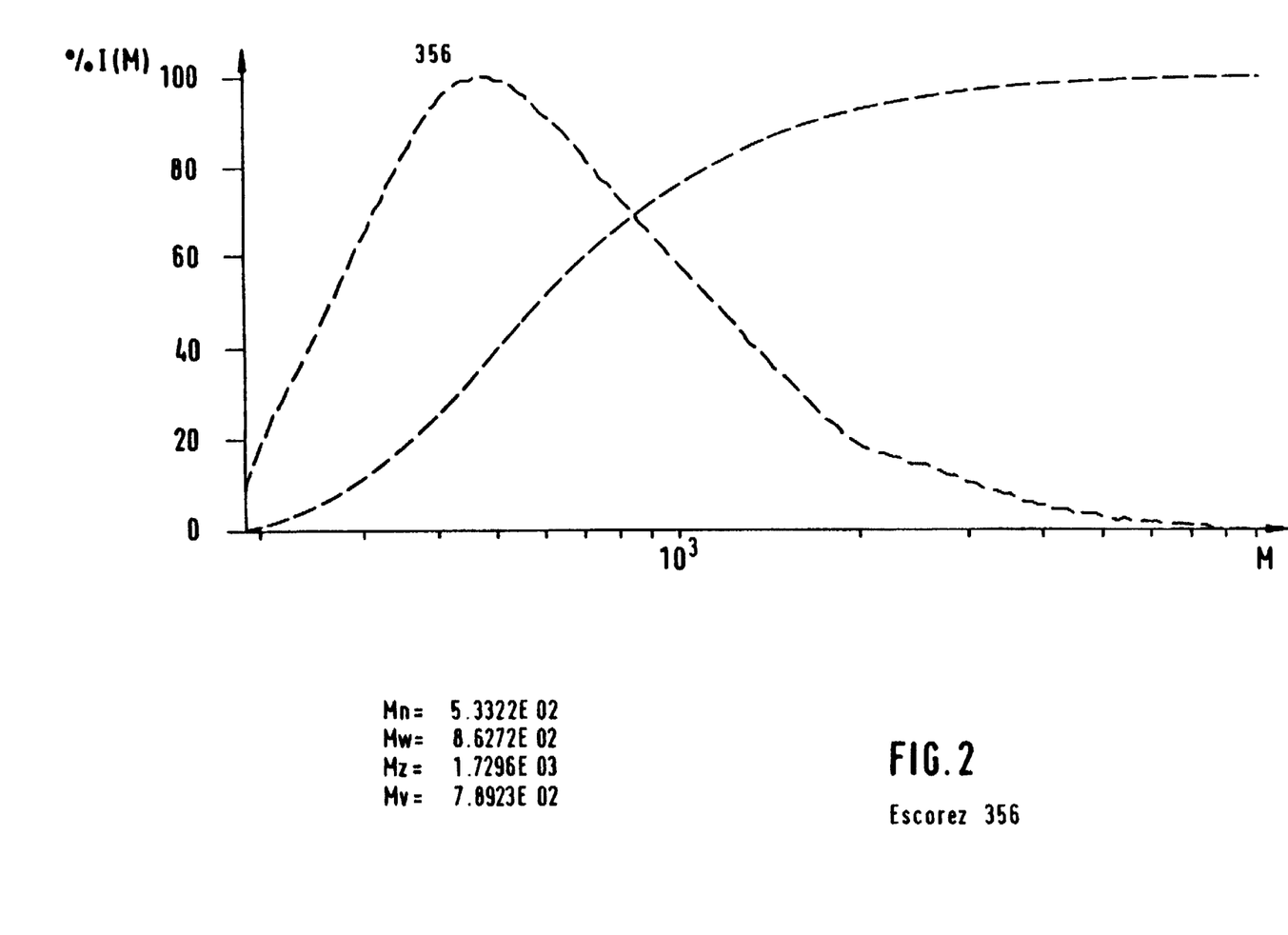
FIG. 2 is a plot similar to FIG. 1, having the same type of curve A and curve B, but for a resin ("Escorez 356") in which the proportion of molecular weight fractions having a molecular weight <1000 is about 70%.

The resin had the molecular weight distribution shown in FIG. 2. The proportion of resin having a molecular weight of less than 1000 was about 70%.

Comparative Example 2

In contrast to Comparative Example 1, a hydrocarbon resin having a mean molecular weight $M_w$ of about 1000 [®Arkon P125 (styrene resin)] was now used. Here too, the properties were significantly worse than in the film according to the invention.

Figure 3:
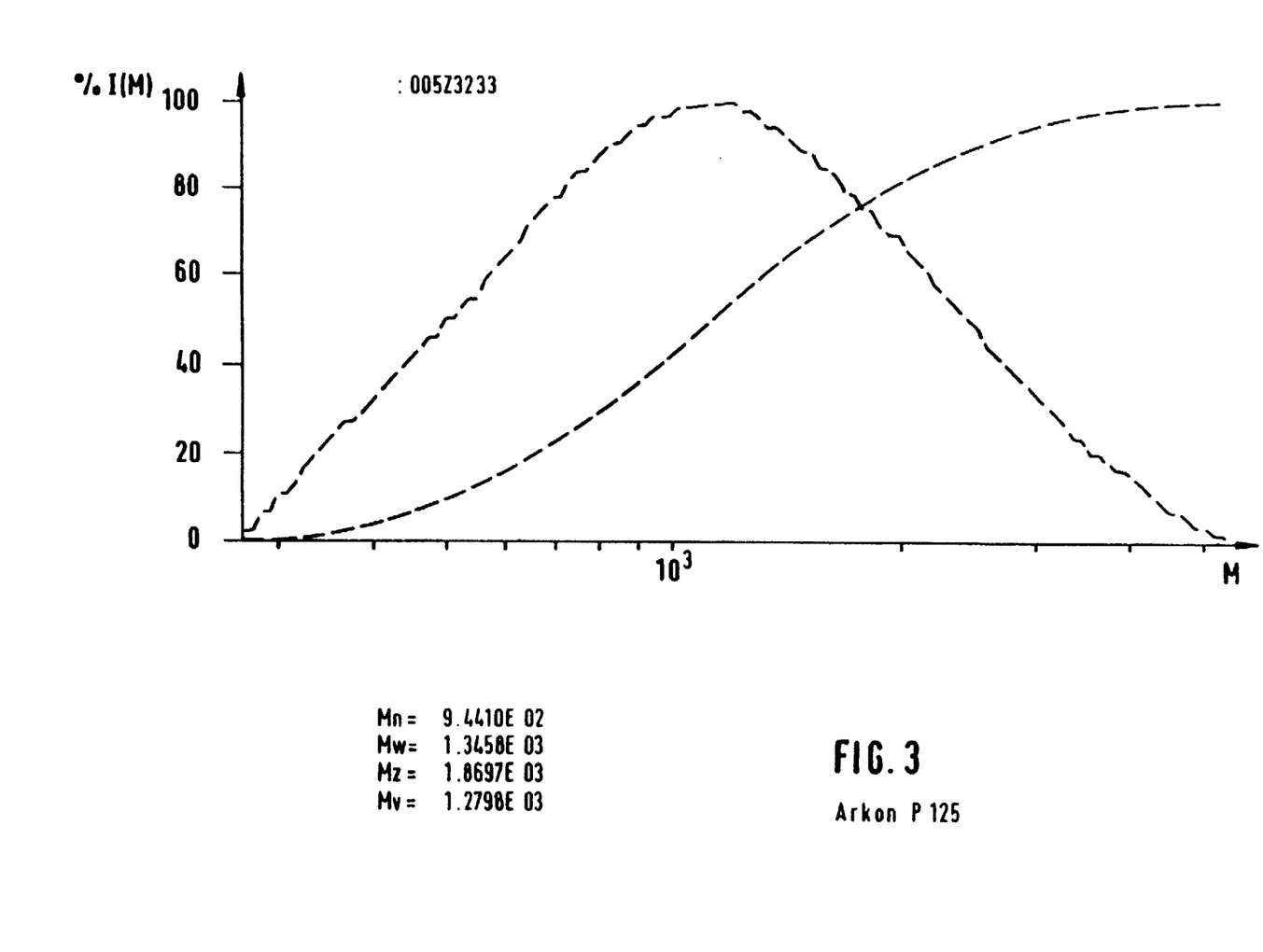
FIG. 3 is a plot similar to FIGS. 1 and 2, having the same type of curve A and curve B, but for a resin ("Arkon P125") used in prior art films.

The resin had the molecular weight distribution shown in FIG. 3. The proportion of resin having a molecular weight of less than 1000 was 40%.

TABLE

| | Permanent set % | | Modulus of elasticity N/mm² | Elongation at % | Sheen | Haze % | Scratch resistance ΔHaze | Deposition on rolls | Blocking during further processing | Migration into fat mg/dm² |
|---|---|---|---|---|---|---|---|---|---|---|
| | long. | transv. | long./trans. | long./trans. | | | | | | |
| E1 | 61 | 62 | 3200/3300 | 120/180 | 105 | 2.3 | 22 | ++ | ++ | 30 |
| E2 | 60 | 61 | 3100/3300 | 105/85 | 105 | 2.2 | 24 | +++ | +++ | 20 |
| E3 | 61 | 60 | 3200/3400 | 95/88 | 108 | 2.1 | 22 | ++++ | ++++ | 15 |
| E4 | 62 | 63 | 3300/3400 | 118/85 | 103 | 2.2 | 23 | + | + | 35 |
| CE1 | 64 | 62 | 3250/3400 | 115/90 | 105 | 2.1 | 23 | − | − | 65 |
| CE2 | 62 | 63 | 3300/3500 | 118/87 | 102 | 2.2 | 24 | − | − | 60 |

E = Example;
CE = Comparative example
+ = no deposition, no blocking, no migration into fat
− = deposition, blocking, migration

We claim:

1. A film having a permanent set in the longitudinal and transverse directions of greater than 50%, said film consisting essentially of a single layer comprising a propylene polymer component and a resin component, the resin of said resin component having a mean molecular weight $M_w$ within the range of 1800 to 8000 and a proportion of resin of molecular weight $M_w$ of <1000 which is at most 35% by weight, based on the weight of the resin component.

2. A film as claimed in claim 1, wherein said resin component consists essentially of a hydrocarbon resin.

3. A polypropylene film as claimed in claim 1, wherein the resin has a mean molecular weight $M_w$ of from 2000 to 8000.

4. A polypropylene film as claimed in claim 3, wherein the resin has a softening point of from 80° to 180° C.

5. A polypropylene film as claimed in claim 3, wherein the resin is added in an amount of from 3 to 40% by weight, based on the weight of the film.

6. A polypropylene film as claimed in claim 1, which has approximately isotropic mechanical properties.

7. A film as claimed in claim 2, wherein said hydrocarbon resin is a homopolymer or copolymer of one or more of the following: a terpene, a vinyl arene, an indene, butadiene, isoprene, or cyclopentadiene.

8. A film as claimed in claim 2, wherein said hydrocarbon resin has a mean molecular weight $M_w$ of from 2000 to 8000.

9. A film as claimed in claim 2, wherein the amount of said hydrocarbon resin component is 3 to 40% by weight, based on the weight of the film, and the softening point of said hydrocarbon resin ranges from 80° to 180° C.

10. A film as claimed in claim 2, wherein said proportion of hydrocarbon resin of a molecular weight $M_w$ of <1000 is at most 30% by weight, based on the weight of the hydrocarbon resin component.

11. A film as claimed in claim 2, wherein the elongation at break of said film is less than 160%, and said permanent set value ranges from 50 to 90%.

* * * * *